April 16, 1968 R. E. MAYER 3,378,325
KITCHEN CABINET CONSTRUCTION
Filed Nov. 22, 1966

INVENTOR
RAYMOND E. MAYER
BY
Busser, Smith + Harding
ATTORNEYS

United States Patent Office 3,378,325
Patented Apr. 16, 1968

3,378,325
KITCHEN CABINET CONSTRUCTION
Raymond E. Mayer, 4634 Tolbut St.,
Philadelphia, Pa. 19136
Filed Nov. 22, 1966, Ser. No. 596,205
9 Claims. (Cl. 312—349)

ABSTRACT OF THE DISCLOSURE

The disclosure relates to a kitchen cabinet construction in which there is provided a cart-like tray or caddy cooperative with a track provided adjacent to the kitchen countertop. The caddy is movable across the countertop and serves as a working area and for transporting kitchen articles between various areas of the kitchen. The cabinets are constructed with an upper row of cabinets extending upwardly from the countertop and set back from a lower row of cabinets beneath the countertop.

Background of the invention

This invention relates to a kitchen cabinet construction of the type comprising a group of lower cabinets positioned below a countertop and a group of upper cabinets located above the countertop and set back from the lower cabinets. There is provided a cart-like tray or caddy cooperable with a track for movement across the counter top for transporting articles around the kitchen.

The kitchen cabinets in use today generally involve a top row of cabinets spaced above a countertop and a lower row of cabinets beneath the countertop. Because of the spacing between the upper row of cabinets and the countertop, it is necessary to provide an appropriate facing for the upright wall of the kitchen in this region, and this adds to the expense of the kitchen. Moreover, this space is unuseable as a cabinet storage area. Furthermore, in the kitchens in use today, there is no provision for minimizing the necessity for carrying kitchen articles about the kitchen during the performance of the usual kitchen chores.

Summary of the invention

Briefly stated, in accordance with the invention there is provided a kitchen cabinet construction comprising a horizontally extending counter top, a row of cabinets beneath the countertop, a row of cabinets above the countertop set back from the lower cabinets, means providing a track extending along the countertop, and a cart-like means cooperable with said track for movement along the countertop. By reason of this construction, the cart-like means can be used as a working area and for receiving articles stored in the various cabinets as well as for the transportation of the articles along the top counter. Moreover, by positioning the upper cabinets so that they are contiguous with the top of the lower cabinets and set back from the front of the lower cabinets, there is a minimum wasted storage space between the upper and lower cabinets.

Description of the preferred embodiment

Figure 1:
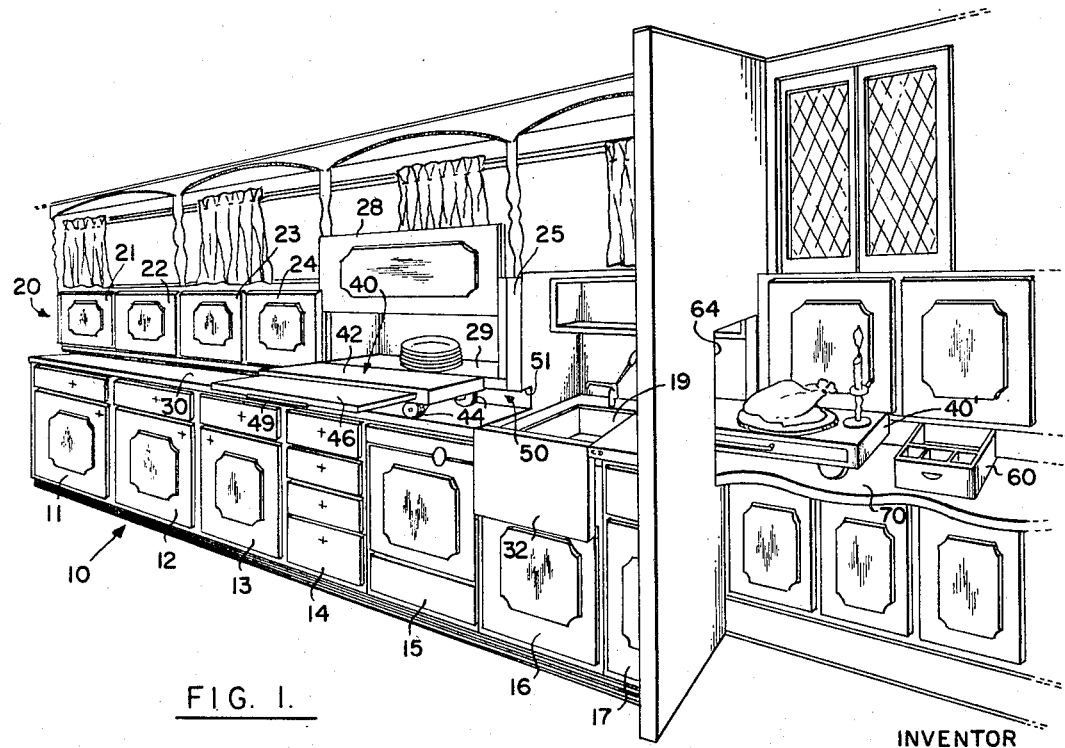
FIGURE 1 is a perspective view of a kitchen cabinet construction in accordance with the invention.

The kitchen cabinet construction shown in the drawing comprises a lower group of cabinets 10 arranged in a row on the kitchen floor, it being noted that the term "cabinets" as used herein is intended to cover the various kitchen appliances such as dishwashers, ovens, freezers, refrigerators, etc., as well as storage cabinets. In FIGURE 1, wherein the kitchen is shown to the left of a vertical partition, the lower group of cabinets are indicated at 11, 12, 13, 14, 15, 16, and 17. Of this lower group, the cabinets 11, 12, 13, 14 and 17 are storage cabinets, cabinet 15 is a dishwasher and cabinet 16 is a sink cabinet containing a sink 19.

Mounted on top of the lower group of cabinets 10 and set back therefrom is a group of upper cabinets indicated generally at 20 and arranged in a row. The cabinets of the upper group may take various forms such as the four small cabinets 21, 22, 23 and 24 located above cabinets 11, 12 and 13 and the long cabinet 25 located above cabinets 14 and 15.

The cabinets of the lower group may be provided with doors and/or drawers of any suitable type. While the upper cabinets may also be provided with various suitable forms of doors and/or drawers, it is preferable that they be provided with doors which can be moved to an open position without any substantial forward movement. For example, the doors may be mounted for sliding upward movement in vertical tracks 27 in the manner of the door 28 for cabinet 25. The purpose of this preferred arrangement of the doors for the upper group is to avoid movement of the doors across the countertop, which movement could accidentally knock over articles on the caddy.

The kitchen countertop is indicated generally at 30 and extends horizontally across the top of the lower group of cabinets 10 and forwardly from the bottom of the upper group of cabinets 20. The countertop 30 may be constructed in accordance with conventional practice so as to include a scratch resistant facing. In the region of the sink cabinet 16 there is provided a countertop section 32 mounted for pivotal movement to the position shown in FIGURE 1 providing access to the sink 19 from a horizontal position covering the sink. In the position covering the sink 19, the section 32 provides a bridge between the portions of the countertop 30 on each side of the sink. The section 32 may be pivotally mounted or mounted in any suitable fashion to permit the described movement. For example, the section may be provided with projecting pins at each end, which pins are received within horizontal bores in the countertop.

There is provided a cart-like caddy 40 in the form of a wheeled tray comprising a tray portion 42 having four wheels 44 mounted thereon and providing a flat top surface. The tray portion 42 is rectangular in form and has width approximating the width of the countertop 30. Mounted in the tray portion is a pull-out shelf 46. The shelf 46 is received in a cavity 48 within the tray portion 42 and is provided with a handle 49 on its forward edge. By grasping the handle 49 the shelf 46 may be moved from a recessed position within the tray portion 42 to the extended position best shown in FIGURE 2. This gives the caddy 40 a greater working area.

Track means are provided for guiding the caddy for longitudinal movement along the countertop. Such means comprises a recessed channel or track 50 formed at the rear of the countertop 30 and the base of the forward end of the upper group of cabinets 20. The rear wheels of the caddy 40 are mounted to project outwardly from the rear edge 41 of the caddy and are adapted to be received in the recessed track 50 for longitudinal movement therein with the wheels beneath the upper horizontal wall 51 of the track 50. The cooperation between the wall 51 of recessed track 50 and the caddy wheels 44 serves to prevent tilting of the caddy 40 forwardly. In addition, the track 50 serves to guide the caddy 40 for movement along the countertop 30.

Figure 3:
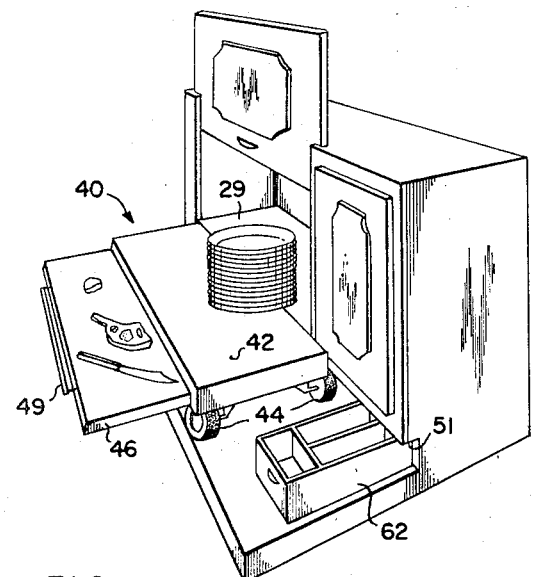
FIGURE 3 is a perspective view illustrating a feature of the invention.

The upper cabinets 20 are preferably provided with horizontal shelves 29 which provide supporting surfaces along horizontal planes in approximate alignment with the top surface of portion 42 of the caddy 40. By this arrangement the articles supported on the shelves 29 may be moved from the cabinets 20 onto the caddy 40 by merely sliding them forwardly. This involves a minimum of effort on the part of the housewife. This feature of the invention is best illustrated in FIGURE 3.

Figure 2:
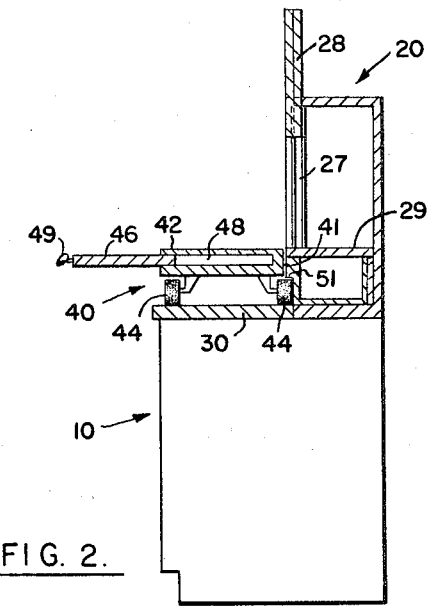
FIGURE 2 is a transverse section of the embodiment shown in FIGURE 1.

In order to utilize a maximum of storage space, the upper cabinets may be provided with drawers such as those indicated at 60 and 62 in FIGURES 1 and 2, respectively. These drawers 60 and 62 are located in the region below the shelves 29 and above the countertop 30. The drawers 60 and 62 are provided with recessed handles to avoid contact with the rear wheels of the caddy as it moves therepast.

Referring to FIGURE 1, there may be provided an opening 64 in the vertical partition, or another kitchen wall providing communication between the kitchen and another room, such as a dining room. In this second room there is provided a countertop 70 in horizontal alignment with the kitchen countertop 30 so that a caddy, as indicated at 40', may be rolled between the adjacent rooms. This avoids the necessity for carrying the caddy from the kitchen to the other room. This adjacent room may also be provided with suitable cabinets as is illustrated in FIGURE 1.

The kitchen cabinet construction in accordance with the invention has many advantages as compared with kitchen constructions in use today. By reason of the provision of the caddy, the housewife is saved time and steps and the amount of lifting is reduced considerably, which is a particular advantage in the case of disabled persons. To illustrate, in the preparation of a meal the caddy can be pushed to a location adjacent the refrigerator where the groceries needed for the meal can be placed thereon with a minimum of effort. The caddy can be then pushed to the cabinets where the necessary dishes may be placed thereon in the manner illustrated in FIGURES 1 and 2. Since the caddy is level with the cabinet shelf 29, the housewife can practically slide the dishes onto the caddy without lifting or stretching. The caddy can then be moved to a location adjacent the sink 19 where the preparation shelf 46 can be pulled out to provide sufficient working area. After the meal is prepared, the caddy can be pushed to the oven or to a location adjacent the dining area as the case may be. In fact, the prepared meal can be pushed from the kitchen through an opening as is shown in FIGURE 1 to the dining room if desired.

By reason of the kitchen construction in accordance with the invention, it is possible to avoid use of the countertop. Accordingly, the kitchen will always appear tidy.

By reason of the specific track means disclosed wherein the wheels of the caddy rest under the wall 51 of the track, the caddy is held against tilting. Moreover, the track means is very simple and involves a minimum of cost.

Furthermore, it is possible to obtain an equal amount of storage space with the cabinet construction in accordance with the invention, as compared with present day cabinets, without the necessity for having a storage area at an excessive height. Thus, as shown in FIGURE 1, the upper cabinets can be reached without any stretching on the part of the housewife.

It will be apparent that various changes may be made in the construction and arrangement of parts without departing from the scope of the invention. For example, various types of cabinets may be used involving different door constructions and arrangement of drawers. Accordingly, it is not desired to be limited except as required by the following claims.

I claim:
1. A kitchen cabinet construction comprising a first group of kitchen cabinets arranged in a row, a second group of kitchen cabinets arranged in a row above said first cabinets and set back from the front thereof, a countertop extending horizontally along the top of said first cabinets and forwardly of the front of said second cabinets, said second group of cabinets being immediately above and extending upwardly from said countertop, means providing a track extending longitudinally of said countertop, and a cart-like tray means adapted for movement along said countertop and for cooperation with said track means so as to be guided thereby for movement along said countertop, said tray means including a body portion providing a relatively low, flat horizontal surface spaced a short distance above said countertop.

2. A kitchen cabinet construction according to claim 1 wherein said cart-like tray means comprises a plurality of wheels mounted on said tray portion and arranged to ride along said countertop.

3. A kitchen cabinet construction according to claim 2 wherein said track providing means comprises a longitudinally extending channel located at the junction of the rear of said countertop and the front end of said second group of cabinets, said channel including an upper horizontally extending wall spaced above said countertop.

4. A kitchen cabinet construction according to claim 3 wherein at least one of said wheels is located to extend beyond the rear edge of said body portion of said tray means so as to be received in said track means channel below said horizontally extending wall.

5. A kitchen cabinet construction according to claim 2 wherein said body portion of said tray means includes a shelf movably mounted in a cavity in said body portion for movement from a location within said cavity forwardly to an extended horizontal position to provide an additional horizontally extending flat surface.

6. A kitchen cabinet construction according to claim 1 wherein at least one of said second group of cabinets comprises a horizontally extending shelf in approximately the same plane as the flat horizontal surface provided by said body portion of said tray means.

7. A kitchen cabinet construction according to claim 6 wherein there is provided at least one drawer in said second group of cabinets located in the region below said horizontally extending shelf and above said countertop.

8. A kitchen cabinet construction according to claim 1 wherein at least one of said first group of cabinets comprises a sink, said countertop comprising a section mounted for movement from a horizontally extending position covering said sink to a position uncovering said sink.

9. A kitchen cabinet construction according to claim 1 wherein at least one of said second cabinets comprises a door mounted for a vertical upward movement to open said cabinet.

References Cited
UNITED STATES PATENTS

| | | | |
|---|---|---|---|
| 294,907 | 3/1884 | Perry | 312—198 X |
| 453,306 | 6/1891 | Langstroth | 312—349 X |
| 1,259,167 | 3/1918 | Ticheli | 312—349 |
| 1,788,883 | 1/1931 | Madsen | 312—203 |
| 2,545,575 | 3/1951 | Gauveau | 312—132 |
| 3,063,768 | 11/1962 | Moore | 312—198 X |

JAMES T. McCALL, *Primary Examiner.*